United States Patent [19]

Frymoyer

[11] 3,882,332

[45] May 6, 1975

[54] PIEZOELECTRIC PHASE DETECTOR

[75] Inventor: Edward M. Frymoyer, Santa Ana, Calif.

[73] Assignee: Rockwell International Corporation, Dallas, Tex.

[22] Filed: Aug. 20, 1971

[21] Appl. No.: 173,434

[52] U.S. Cl. .................................. 310/8.1; 310/9.8

[51] Int. Cl. .................................. H04r 17/00

[58] Field of Search ........ 310/8, 8.1, 9.8; 333/30 R, 333/72

[56] References Cited

UNITED STATES PATENTS 3,617,923 11/1971 Paradysz ......................... 310/9.8 X

*Primary Examiner*—Mark O. Budd

*Attorney, Agent, or Firm*—Howard R. Greenberg

[57] ABSTRACT

A phase detector using crystal filters in two signal paths subject to signal phase detection with a single piezoelectric material unit common to and interconnecting the crystal filters of the two signal paths. A signal combining electrode also on the single piezoelectric material unit is connected to a following amplitude detection circuit section.

10 Claims, 8 Drawing Figures

PIEZOELECTRIC PHASE DETECTOR

Figure 1:
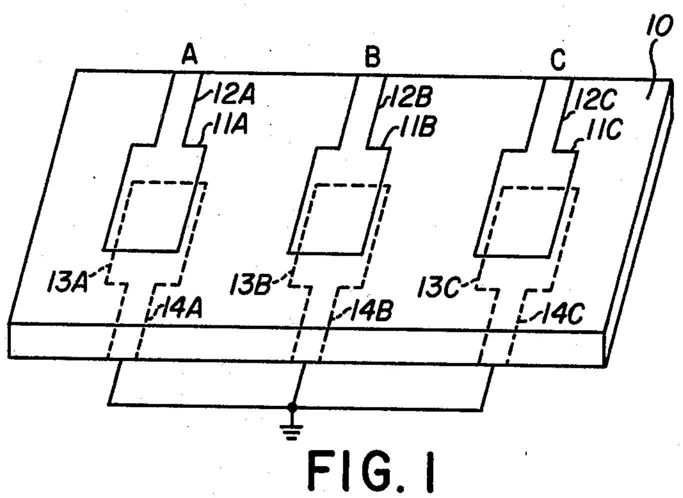

This invention relates in general to crystal filter equipped phase detectors and, in particular, to a piezoelectric phase detector using a pair of highly selective crystal filters having a common piezoelectric plate.

With many signal systems such as radar systems, sonar systems, and vibration monitoring systems, it is necessary to compare the phase difference between two signals. The desired result is usually the phase difference at the point of detection, but many errors and uncertainties are many times introduced into the system by the required signal processing through to the point of phase comparison. Typically, highly selective filters are needed to reject strong, unwanted signal components such as the transmit pulse from a radar or active sonar system. Such highly selective electrical filters are narrow band devices that, to achieve the required selectivity, must have a large phase slope through the pass band. Then, when separate filters are used, extreme care must be exercised to insure use of matched sets of filters having nearly identical phase slopes in order to minimize uncertainties in final phase difference values detected. Further, a severe requirement is that phase response be substantially identical over a wide temperature operational range. When discrete component filters are used, even those containing highly temperature stable crystals, random variations in temperature coefficients make careful matching and selection of components mandatory.

It is, therefore, a principal object of this invention to provide a highly accurate reliable compact phase detector with minimum components.

Another object is to insure that the phase temperature behavior of the two filter signal paths be substantially the same with the phase detector imparting minimal if any phase measurement error over the operational temperature range.

Features of the invention useful in accomplishing the above objects include, in a piezoelectric phase detector, two crystal filters using a common single piezoelectric bar, or plate, as the basic selective element of the pair of highly selective crystal filters. Thus, the phase characteristics of the pair of filters, as used in a phase detector, are substantially identical over the operational frequency range and throughout the range of ambient temperature experienced during operation.

Specific embodiments representing what are presently regarded as the best modes of carrying out the invention are illustrated in the accompanying drawings.

Figure 2:
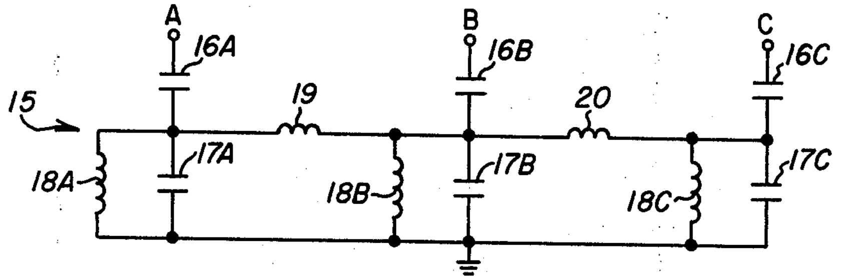
Figure 3:
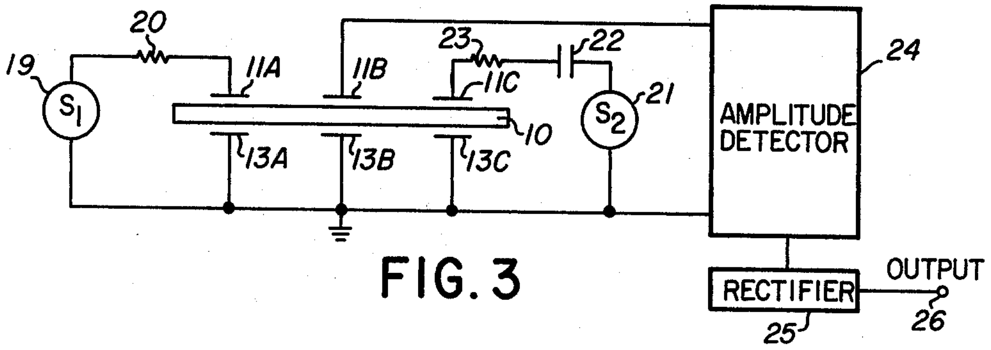
Figure 4:
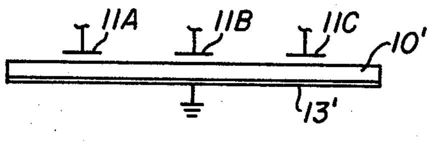
Figure 5:
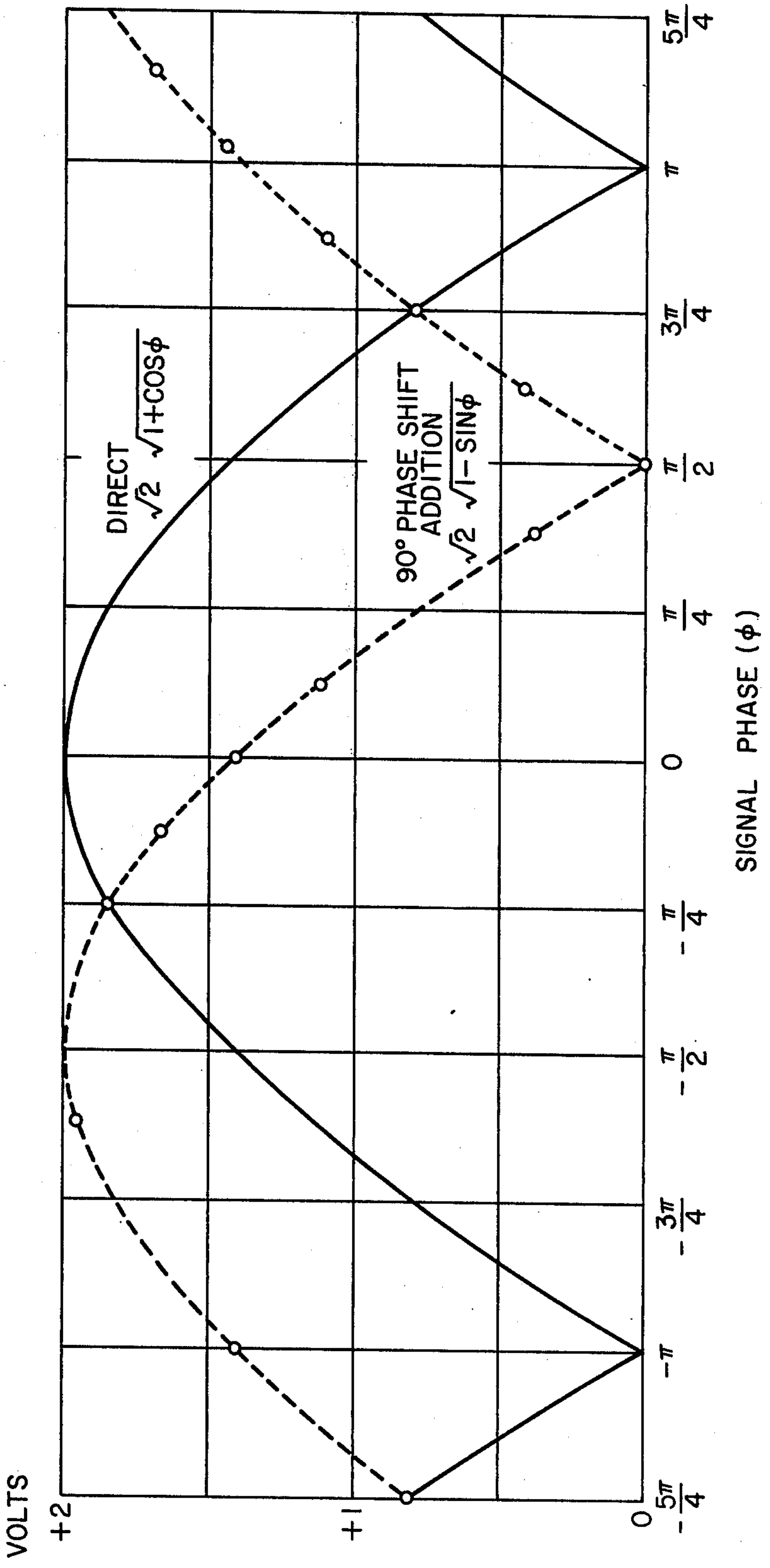
Figure 6:
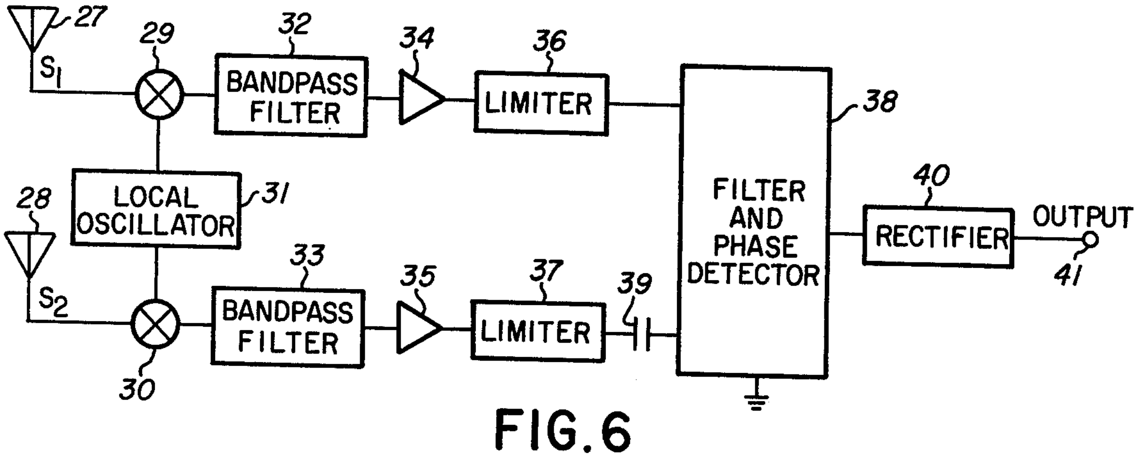
Figure 7:
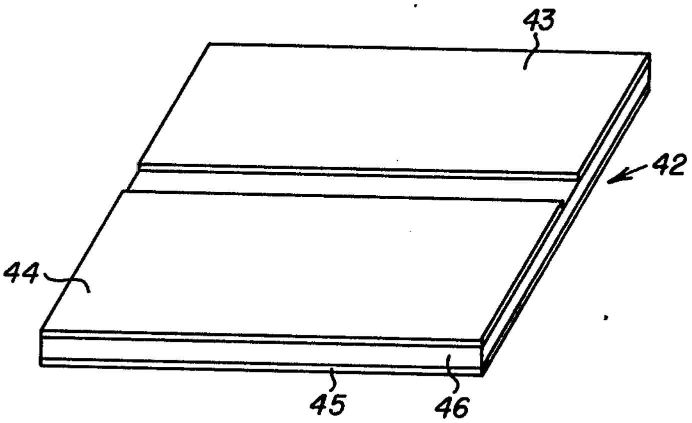

In the drawings:

FIG. 1 represents a single plate of quartz or other stable piezoelectric material with three electrode deposited plates on one side and three like aligned deposited electrode plates on the other side;

FIG. 2, an equivalent electrical circuit for the combination filter electrode equipped piezoelectric material plate of FIG. 1;

FIG. 3, a combination phase detector block and filter schematic using the combination filter electrode equipped piezoelectric material plate of FIG. 1;

FIG. 4, an alternate single piezoelectric material plate multiple filter unit, for that of FIG. 1, with three electrode plates on one side and a single common plate on the other side;

FIG. 5, resulting rectified output waveforms of the $S_1$ and 90° shifted $S_2$ input signals from the phase detector of FIG. 3;

FIG. 6, a combination block and schematic of a phase detector such as would be used in radar application;

FIG. 7, a piezoelectric device in the form of a longitudinal mode crystal; and

Figure 8:
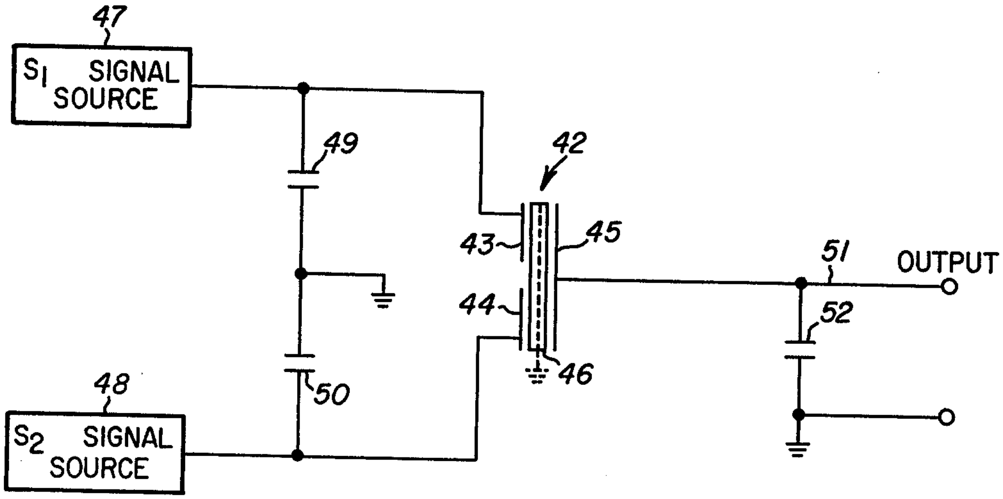

FIG. 8, a combination block and schematic of a filter circuit using the piezoelectric device of FIG. 7.

Referring to the drawings:

A single planar piece or bar of quartz 10, or other stable piezoelectric material, properly oritented with respect to the crystallographic axis has three suitably spaced electrodes 11*a*, 11*b*, and 11*c*, of correct thickness to operate as a monolithic crystal filter, deposited on an upper side thereof. The electrodes 11*a*, 11*b*, and 11*c* are provided with leads 12*a*, 12*b*, and 12*c*, respectively, extending to an edge of the piezoelectric plate 10. Three electrodes 13*a*, 13*b*, and 13*c* of like shape are deposited on the bottom side of the piezoelectric plate 10 in alignment with electrodes 11*a*, 11*b*, and 11*c* and have conductive material line deposited leads 14A, 14B, and 14C extending to the opposite side edge of the plate 10 for connection to a common ground. The equivalent electrical circuit 15 from the ABC leads 12*a*, 12*b*, and 13*c* through to the common ground is as shown in FIG. 2. This is as if there were connections from the respective ABC terminals through the capacitors 16*a*, 16*b*, and 16*c*, respectively, and on through capacitors 17*a*, 17*b*, and 17*c* in parallel, respectively, with coils 18*a*, 18*b*, and 18*c* to ground. Further, the circuit acts as if there is an inductive coil 19 like interconnect between the common junction of capacitors 16*a* and 17*a* to the common junction of capacitors 16*b* and 17*b*, and effectively an inductance as represented by coil 20, between the common junction of capacitors 16*b* and 17*b* and capacitors 16*c* and 17*c*.

Referring also the phase detector of FIG. 3, the electrode pad 11*a* in combination with the ground connected electrode pad 13*a*, on opposite sides of the piezoelectric material plate 10, and the electrodes 11*b* and 13*b* form a first crystal filter fed by $S_1$ signal source 19, having one terminal connected to common ground and the other terminal connected through resistor 20 as the A terminal input connection to electrode pad 11*a*. Electrode pad 11*c* and ground connected electrode pad 13c together with electrodes 11*b* and 13*b* form a second crystal filter with the piezoelectric plate 10 that is fed by $S_2$ signal source 21 with one terminal connected to common ground and the other terminal connected serially through capacitor 22 and resistor 23 as the C terminal input to the electrode pad 11*c*. Electrode pad 11b opposite ground connected electrode pad 13*b* on piezoelectric material 10 also acts as a signal combiner from the first and second filters and as an output terminal feeding the combined signal to amplitude detector circuit 24, also connected to the common ground, for providing the phase detected ouput through a line connection to rectifier circuit 25 and producing a desired output at terminal 26.

In order that proper filtering action be provided via the piezoelectric material device in the phase detector of FIG. 3, it is important that the piezoelectric material plate 10 be properly oriented with respect to the crystallographic axis in achieving desired sonic signal coupling between the electrodes deposited thereon. The electrode spacings and thicknesses are chosen such that the desired mechanical mode of operation will result in such mode coupling as required for the desired two pole filter shape (Chebychev, Butterworth, Gaussian, or other such operational mode). The lateral spacings between electrode pads and electrode area sizes, at least for some applications, along with electrode thicknesses must be as nearly identical as possible, although, for example, area of contact pads can be different provided the networks associated therewith feed into proper impedances in accomplishing design objectives. Generally, plate thickness of the piezoelectric material between electrodes must also be as uniform as possible other than for an occasional departure therefrom in meeting specific design requirements. With the phase detector of FIG. 3, the $S_1$ and $S_2$ signals are signals in the passbands of the filters associated, respectively, with electrodes 11*a* and 11*c* for which the relative phase is desired. Assuming the signals to be of equal magnitude and frequencies, the voltage output of the device after signal recitifcation will be a function of the phase difference of the two signals such as shown in FIG. 5 with a 90° phase shift added to the $S_2$ signal via utilization of the capacitor 22. Ambiguity between positive and negative $\phi$ in the range of $-90° \leq \phi \leq +90°$ is removed with such angles normally being in the range encountered in sonar and radar applications. The piezoelectric material 10' device of FIG. 4 may be employed in place of the piezoelectric material 10 device of FIG. 3 with substantially the same operational results. The electrode pads 11*a*, 11*b*, and 11*c* are substantially the same in the two devices with, however, the device of FIG. 4 having a common plate electrode 13' connected to ground as opposed to the separate electrodes 13*a*, 13*b*, and 13*c* with the device of FIG. 3. Though use of the same piezoelectric material, carefully oriented and suitably shaped, whether of the device configuration of FIGS. 1 and 3 or that of FIG. 4, the phase temperature behavior of the two filter paths is substantially the same with the device imparting little or no phase measurement error over the operational temperature range.

A typical phase detector application as used in a phase sensitive radar application is shown in FIG. 6. The $S_1$ and $S_2$ signals plus noise and interference received by antennas 27 and 28, respectively, are beat down in frequency in a phase coherent manner through use of mixers 29 and 30 and local oscillator 31. The outputs of mixers 29 and 30 are passed as inputs to bandpass filters 32 and 33, respectively, referred to as roofing filters by some skilled in the art, have a band pass of from 5 to 10 times the bandwidth of the associated following crystal filters. The broad bandpass filters 32 and 33 that remove most of the interference without introducing significant phase temperature sensitivity requirements, are followed, respectively by amplifiers 34 and 35 output limited by limiter circuits 36 and 37. These amplifier-limiter combinations insure equal amplitude signals for processing by the phase detector filter section 38 with the output of limiter 36 applied as an input thereto and the output of limiter 37 applied through capacitor 38 as a signal input thereto. Filter and phase detector 38 uses a single piezoelectric plate multiple filter device, such as that of FIGS. 1 and 3 or that of FIG. 4, in developing an output passed to rectifier 40 in obtaining the desired rectified output at output terminal 41. Here again the capacitor 39 in the output line from limiter 37 removes the ambiguity of the positive and negative angles in the range of $-90° \leq \phi \leq +90°$ by introducing a $-90°$ phase shift. While the capacitor 39 is optional when used, it should be large enough so that its reactance is small at the designed operational frequency of the phase detector operation. The filters in the phase detector are narrow band filters and phase detection is provided with the typical output A $\sqrt{2}\cos\omega t\,(1-\sin\phi)$ where $\phi$ is the phase, A peak amplitude, $\omega = 2\pi F$, and $t$ = time. Thus, the amplitude detected and found by the detector and rectifier circuit contains the phase information in a relatively high frequency embodiment within the range of 3 MHz to 100 MHz typically using, but not restricted to, AT cut quartz.

In a lower frequency embodiment for sonar or analysis application where the frequency may fall somewhere, for example, in the range of 20 kHz to 200 kHz a piezoelectric device 42, such as shown in FIG. 7, in the form of longitudinal mode crystal, typically a +5° crosscut quartz crystal may be used. With the piezoelectric device 42, plating is split longitudinally on the upper surface to result in two electrode pads 43 and 44 substantially identical in surface area an thickness, and with the bottom side of the crystal structure a fully plated layer 45 forms the third electrode of the device 42. Piezoelectric device 42 operates in its fundamental length longitudinal mode and should be designed so no other modes, particularly flexural modes, are available in the crystal piezoelectric material plate 46 near the desired frequency of operation..

FIG. 8 illustrates a typical filter circuit with the piezoelectric device 42 employed therein as a narrow band filter in the form of a $\pi$ latter section filter in the circuit. $S_1$ and $S_2$ signal sources 47 and 48 are connected as the signal inputs to electrode pads 43 and 44, respectively, and the input leads thereof are connected through matched capacitors 49 and 50 to ground to result in piezoelectric device 42 thereby having an image ground as represented by the phantom showing of ground with respect thereto. The bottom plate terminal 45 of the piezoelectric device 42 serves the function of combining the input signals to electrode pads 43 and 44 via the common piezoelectric material plate 46 in providing an output on output line 51. The output signal on line 51, having a connection through capacitor 52 to ground, may be applied through an amplitude detector and rectifier in developing an output such as developed with the embodiments of FIGS. 3 and 6. Here again the piezoelectric device 42 forms the frequency selective element and is identical for both crystal filters having substantially the same properties as desired in the filter function for ultimately performing the desired phase detection. This low frequency form works particularly well in sonar applications and in analysis equipment where phase information is desired at a standard comparison frequency, for example, 100 kHz. The acoustic waves add constructively when the signals are in phase, destructively when 90° out of phase, and some intermediate but prescribed value when at some intermediate phase angle with frequency selection being accomplished by the mechanical resonant properties of the coupled acoustic system.

Whereas this invention is here illustrated and described with respect to several specific embodiments hereof, it should be realized that various changes may be made without departing from the essential contributions to the art made by the teachings hereof.

I claim:

1. In a phase detector circuit unit using crystal filters, a phase detector section; first signal source means; second signal source means; first crystal filter means circuit connected to said first signal source means; second crystal filter means circuit connected to said second signal source means; said first and second crystal filter means having substantially identical phase characteristics and phase temperature behavior, piezoelectric material means common to and interconnecting said first and second crystal filter means; and signal combining electrode means on said piezoelectric material means circuit connected in said phase detector section.

2. The phase detector circuit unit of claim 1, wherein said piezoelectric materials means is a piezoelectric material plate.

3. The phase detector circuit unit of claim 2, wherein said first crystal filter means includes a first signal input electrode deposited on said piezoelectric material plate; and said second crystal filter means includes a second signal input electrode deposited on said piezoelectric material plate.

4. The phase detector circuit unit of claim 3, wherein said signal combining electrode means is a third electrode deposited on said piezoelectric material plate.

5. The phase detector circuit unit of claim 4, wherein said first, second, and third electrodes are deposited on a first common face of said piezoelectric plate; and voltage potential reference source connected electrode means is deposited on a second face of said piezoelectric plate.

6. The phase detector circuit unit of claim 4, wherein said first and second signal input electrodes are substantially the same in area and substantially the same thickness.

7. The phase detector circuit unit of claim 6, wherein said piezoelectric material plate has opposite first and second spaced substantially parallel faces; and with said first and second signal input electrodes deposited on said first face, and said third electrode is deposited on said second face.

8. The phase detector circuit unit of claim 7, wherein said first signal source is circuit connected both to said first signal input electrode and through first capacitive means to a voltage potential reference source; and said second signal source is circuit connected both to said second signal input electrode and through second capacitive means to said voltage potential reference source.

9. The phase detector circuit unit of claim 4, wherein first band pass filter means is included in the signal circuit path between said first signal source and said first electrode; and second band pass filter means is included in the signal circuit path between said second signal source and said second electrode.

10. The phase detector circuit unit of claim 9, wherein capacitive signal phase shifting means is also included in the signal circuit path between said second signal source and said second electrode.

* * * * *